Oct. 1, 1929. L. RUFFIO Re. 17,447

ATTACHMENT FOR HAIR DRYING MACHINES

Original Filed Jan. 23, 1923

INVENTOR
Louis Ruffio
BY
Harold D. Penney
ATTORNEY

Reissued Oct. 1, 1929

Re. 17,447

UNITED STATES PATENT OFFICE

LOUIS RUFFIO, OF NEW YORK, N. Y.

ATTACHMENT FOR HAIR-DRYING MACHINES

Original No. 1,504,149, dated August 5, 1924, Serial No. 614,444, filed January 23, 1923. Application for reissue filed January 12, 1926. Serial No. 80,844.

This invention relates to an attachment for a hair drying machine.

The principal object of the invention is the provision of an attachment for use in ladies' hair dressing establishments, for drying the hair when a "water wave" is desired.

A further object of the invention resides in the provision of a device including a hood adapted to be placed over the head of a person, and means whereby air from a blower is introduced in the top of said hood for permitting the equal distribution of air within the same.

A further object is the provision as a new article of manufacture of a detachable hood of the character described whereby when such a hood deteriorates by use it may be replaced by a similar hood.

A further object of the invention is the provision of a device which is easily and quickly applied to the head of an individual and when so applied will greatly reduce the time now required for drying the hair for a water wave.

A further object of the invention is to provide a device of the character mentioned, having a conduit of U-formation, one leg of which supports a hood capable of being placed on the head while a person is in a sitting posture.

A still further object of the invention is the provision of a device which is extremely simple in construction, cheap to manufacture and easily applied, and with these and other objects in view, the invention resides in certain novel construction, combination and arrangement of parts, the essential features of which are hereinafter fully described in the specification and pointed out in the appended claims and illustrated in the accompanying drawing, in which:

The drying machines now in use by hair dressing establishments require the services of an attendant who must remain at the machine to hold the hose or nozzle, and see that the air is directed to various parts of the hair during the drying operation. When drying for a water wave this operation requires some thirty minutes or more, during which time an attendant must remain at the machine. It is therefore my invention to provide an attachment which will permit an attendant to leave the machine during the drying operation of one customer so that he may attend to the hair of another customer. This will greatly increase the value of an attendant for the reason that he is not compelled to wait until the hair of one customer is dried before he is able to attend another.

Figure 1:
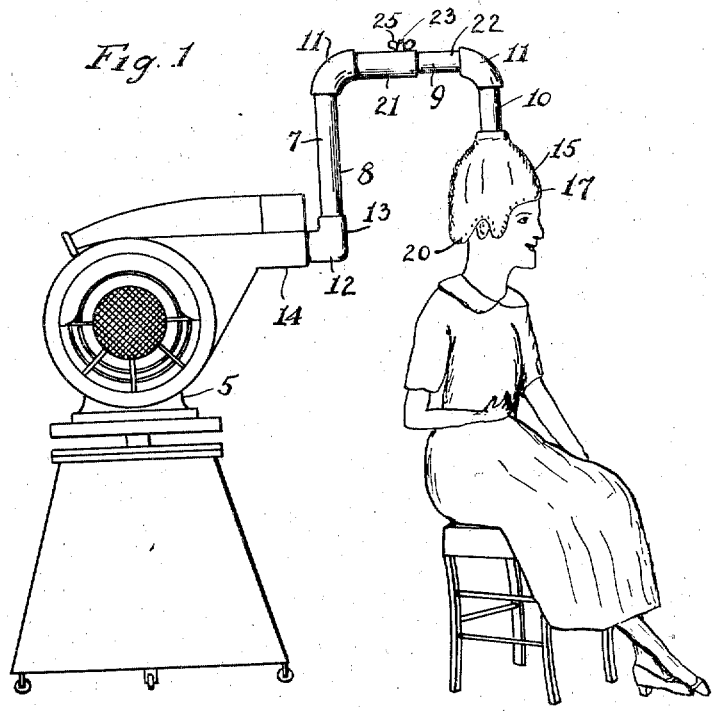
Figure 1 is a view in elevation showing the attachment in use.
Figure 2:
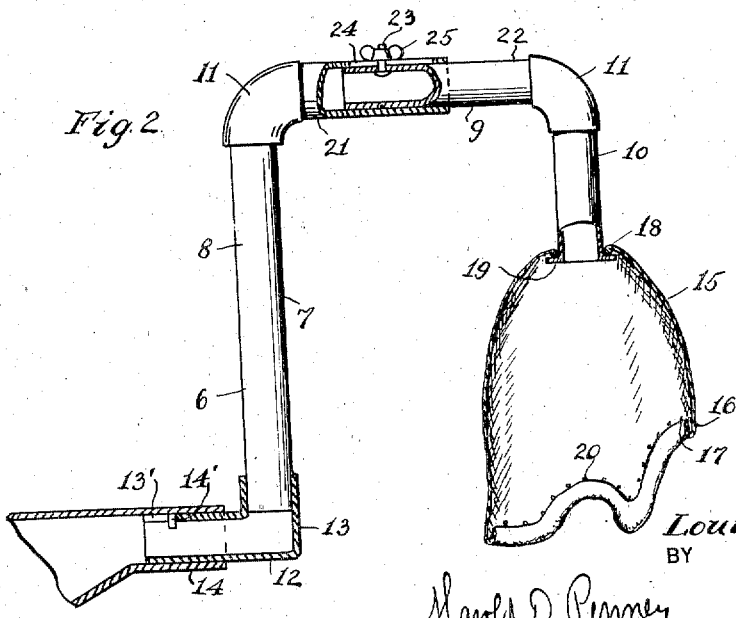
Figure 2 is an enlarged view partly in section and partly in elevation.

Referring more particularly to the drawings, the numeral 5 designates an electrical blower of the usual construction, and 6 the lower end of my attachment which in Figure 1 is shown connected with the blower.

The attachment at 6 includes a conduit 7 which comprises a vertical section 8, a horizontal section 9, and a relatively short vertical section 10. Elbows 11 connect the horizontal section 9 with the sections 8 and 10, and as shown in the drawing the sections when assembled constitute a conduit of inverted U-formation. An attaching means 12 is provided on the section 8 and in the present instance is shown as an elbow 13 having its vertical leg secured to the section 8 and the horizontal leg capable of telescopic engagement with the spout 14 of the blower. The horizontal portion of the elbow 13 is provided with a slot 13′ for coaction with a pin 14′ carried by the spout 14 of the blower for preventing lateral movement of the attachment. It will be noted that by providing the conduit with a relatively short leg 10 the hood which is presently to be described is supported so as to permit the same to be applied to the head of a person while in a sitting posture.

A hood or container 15 of domed cap-like formation is carried by the section 10 and the same is made of any suitable flexible material. The lower periphery of the hood is provided with a hem receiving a resilient wire 16 so as to comfortably fit about various sized heads. The lower periphery of the hood terminates in front at the forehead and extends backwardly and downwardly around the head of the user of the hood, preferably being curved inwardly and upwardly over the ears as at 17, so as to substantially cover the hair of the head from the crown of the head to the lower line of the hair on the forehead and at the sides of the head and at the nape of the neck.

The upper part of the hood is slightly tapering to provide a small inlet opening around which is formed a hem receiving a clamping ring 18 adapted to pass about the sections 10, and rest upon a flange 19 formed on the lower end of said section 10. It will be understood that by making the hood detachable the same may be removed and washed for sanitary purposes, and when deteriorated by use may be replaced by a similar new hood. Apertures 20 are provided in the lower periphery of the hood 15 for permitting the escape of air from said hood. The intramarginal portion of the hood, that is the portion between the ring 18 and the apertures 20, is imperforate to cause the air entering the hood at said inlet opening to pass downwardly through the hood and escape through the apertures 20; the line of the apertures 20 around the lower portion of the hood substantially conforming to the lower line of the hair at the forehead and at the sides of the head and at the nape of the neck of the user of the hood, so that the drying fluid entering at the inlet opening of the hood shall pass downwardly through the hair and escape through the apertures 20, thus effectually drying the whole extent of the hair.

In order to adjust the short section 10 with respect to section 8, I construct section 9 of two parts 21 and 22 for telescopic engagement with each other. Means is also provided for securely holding the section in adjusted position and consists of a bolt 23 carried by the section 22 and slidable in a slot 24 in the member 21. The bolt 23 receives a thumb nut 25. By this arrangement various degrees of horizontal adjustment may be obtained should the same be desired for comfortably connecting the hood with the head of a person.

In operation, it will be seen that the air generated by the blower 5 will be led to the top of the hood 15, where it enters the hood and is equally distributed therein.

While the attachment is primarily intended for drying the hair for a water wave it is to be understood that the same may be used for various other purposes, and that changes and alterations and modifications as come within the claims may be resorted to when desired.

What is claimed as new is:

1. In a means for introducing a drying medium to the head in the process of waving the hair, a hood formed to fit cap-like upon the head, and a conduit opening at one end of the hood and formed at its free end for connection with the nozzle of a blower, said conduit formed of a pair of adjustable parts.

2. In a means for introducing a drying medium to the head in the process of waving the hair, a hood formed to fit cap-like upon the head, and a conduit opening at one end of the hood and formed at its free end for connection with the nozzle of a blower, the said conduit being substantially of inverted U-formation so that one leg thereof serves to support the hood for connection with the head while the person is in a sitting posture.

3. An attachment for a blower comprising a conduit of relatively inverted U-formation, means on one end of said conduit for securing the same to the nozzle of said blower, and a flexible hood adapted to be placed over the head and secured to the other end of said conduit.

4. A device of the class described, the combination with a blower, a conduit of inverted U-formation, one leg of said conduit having means for attaching the same to the nozzle of said blower, the other leg of said conduit removably supporting a hood formed to fit cap-like upon the head.

5. An attachment for a blower comprising a hood of flexible material adapted to be placed over the head and provided with a stiff marginal edge for clamping engagement with the head, a conduit, means on one end of said conduit for connection with the nozzle of the blower, the other end of said conduit having connection with the top of said hood whereby air is directed downward therein upon the top of the head.

6. An attachment for a blower comprising a conduit including a pair of vertical legs, one of said legs adapted to be connected to a blower, the other of said legs supporting a hood for connection with the head of a person, and means connecting said legs for horizontally adjusting said hood.

7. An attachment for a blower comprising a conduit including a pair of vertical legs, one of said legs adapted to be connected to a blower, the other of said legs supporting a hood for connection with the head of a person, and means connecting said legs for horizontally adjusting said hood, and means for permitting escape of air from said hood when the same is upon the head of a person.

8. The combination with means for supplying drying fluid, of a hood having an upper portion provided with an inlet opening and having a lower portion adapted to engage around a person's head so that the upper portion of the head is received within the hood, and the hair is enclosed by the hood to substantially the lower line of the hair around the head, said lower portion being provided with means for escape from the hood at substantially the lower line of the hair around the head of drying fluid entering the hood at said opening by passage of the fluid downwardly to said escape means through the hair of the head, means for conveying the drying fluid from the first mentioned means to said inlet opening, and means for detachably securing the hood at said inlet opening to the last mentioned means.

9. The combination with means for supplying drying fluid, of a hood having an upper portion provided with an inlet opening and having a lower portion adapted to engage around a person's head so that the upper portion of the head is received within the hood and the hair of the head is enclosed by the hood substantially from the crown of the head to the lower line of the hair at the forehead and at the sides of the head and at the nape of the neck, said lower portion being provided with means for escape of the drying fluid entering the hood at said opening by passage of the fluid to said escape means through the hair at substantially the lower line of the hair at the forehead and at the sides of the head and at the nape of the neck, and means for conveying the drying fluid from the first mentioned means to said inlet opening.

10. The combination with means for supplying drying fluid, of a hood having an upper portion provided with an inlet opening and having a lower portion formed at its lower edge for engaging the head of a person at substantially the lower line of the hair at the forehead and at the sides of the head and at the nape of the neck so that the upper portion of the head is received in said hood, apertures through the hood arranged around said lower portion adjacent to its lower edge and extending in a series substantially in conformity to the line of said edge, and means for conveying the drying fluid from the first mentioned means to said inlet opening.

11. As a new article of manufacture, a hood having an upper portion provided with an inlet opening having appurtenant thereto means for securing the inlet opening to means for supplying drying fluid and having a lower portion adapted for engaging around the head of a person so that the upper portion of the head is received within the hood and the hair is enclosed in the hood to substantially the lower line of the hair around the head, said lower portion being provided with means for escape from the hood at substantially the lower line of the hair around the head of drying fluid entering at said inlet opening.

12. As a new article of manufacture, a hood having an upper portion provided with an inlet opening having appurtenant thereto means for securing the inlet opening to means for supplying drying fluid and having a lower portion formed at its lower edge for engaging a person's head in substantial conformity to the contour of the head defined by the lower line of the hair at the forehead and at the ends of the head and at the nape of the neck so that the upper portion of the head is received in the hood, means appurtenant to said lower edge for tensionally engaging said lower portion around the head, and a series of apertures through the hood adjacent to said edge and extending all around the head a line substantially conforming to said contour of the head, the body of the hood from said inlet opening to said apertures being imperforate.

13. As a new article of manufacture, a hood having an upper portion provided with an inlet opening having appurtenant thereto means for tensionally securing the inlet opening to means for supplying drying fluid and having a lower portion having a hem at its lower edge for engaging a person's head in substantial conformity to the contour of the head defined by the lower line of the hair at the forehead and at the sides of the head and at the nape of the neck so that the upper portion of the head is received in the hood, means in the last mentioned hem for tensionally engaging said lower portion around the head, and apertures through the hood adjacent to the last mentioned hem and extending in a line sustantially conforming to said contour of the head.

14. As a new article of manufacture, a hair drying hood of flexible material having an upper portion provided with an air inlet opening and having a larger lower portion adapted to receive a person's head to substantially the lower line of the hair around the head, a hem around said inlet opening and a hem around the bottom edge of the hood, means in the first hem for detachably securing the hood to means for supplying hot air, and means in the second hem for tensionally securing the lower portion of the hood around the head, said lower portion being provided with apertures adjacent to the last mentioned hem for permitting air passing into the hood by said inlet to pass out of the hood through said apertures substantially at the lower line of the hair around the head, the portion of the hood between said inlet opening and said apertures being imperforate.

15. A hair drying hood formed with an inlet opening and a large lower portion formed to receive the upper part of a person's head and to extend to the lower part of the scalp all around the head; said hood being provided all around the lower edge with openings for the exit of air passing in at said inlet opening.

16. A hood adapted to interconnect between the discharge end of an air hair-drying apparatus and the head, including means for allowing the air to escape freely from the hood after contacting with the hair thereby establishing a circulation of the air within the hood.

17. In combination, a hood formed with an upper air-inlet-opening and a large lower portion formed to receive substantially all of a person's hair and the upper and back part of the head; the lower part of the hood being provided all around with apertures for the exit of air passing in at said upper opening and in contact with the hair.

18. In combination, a hood formed with an upper air inlet opening and a large lower portion formed to receive the upper part of a person's head and to extend to the nape of the neck; the lower margin of the hood being provided entirely around with apertures for the exit of air passing in at said upper opening; the intermediate portion of the hood between said inlet and aperture being imperforate to prevent exit of the air at such portions and to cause all of the passing air in at said opening to pass from the upper to the lower part of the hood.

19. In combination, a hair drying hood formed with an upper air inlet opening and a larger lower portion formed to receive a person's hair and the upper part of the head; a hem formed at the bottom periphery of the hood completely around the hood and below substantially all of the hair; said lower periphery being provided with a series apertures adjacent to said hem and extending all around the head for permitting air passing in at said upper opening and through the hair to pass out below the hair.

20. A hair drying hood formed with an inlet opening and a large lower portion formed to receive a person's hair and the upper part of the head; the lower part of said hood being provided with adjustable means to conform it to the person's head.

21. A hair drying hood formed with an inlet opening and a large lower portion formed to receive the upper part of a person's head; the lower part of said hood being provided with yieldable means to conform it to the person's head.

22. In combination, a hood formed with an inlet opening and a large lower portion formed to receive the upper part of a person's head; and a resilient wire secured along the lower periphery of the hood.

23. In combination, a hood formed with an inlet opening and a large open lower portion formed to receive the upper part of the head; a hem on the lower periphery of the hood; and a resilient wire in said hem for adapting the lower periphery of the hood to fit various sized heads.

24. A hair-drying hood formed to receive a person's head and to terminate in front of the forehead, and to extend in the back substantially to the neck and at the sides above the ear to the top of the ear and down immediately at the front and rear of the ear substantially to the bottom of the ear.

25. A hood formed to receive a person's head and to terminate in front of the forehead, and to extend in the back near the neck and at the sides above the ear to near the top of the ear and down at the front and rear of the ear to near the bottom of the ear; and a wire at the bottom edge of the hood.

26. In combination, a hood of cap-like formation entirely of freely flexible washable material having a tapering upper portion formed with a small upper inlet opening and a larger lower portion formed to receive a person's head and to terminate in front of the forehead, and to extend in the back substantially to the neck and at the sides above the ear to the top of the ear and down immediately at the front and rear of the ear substantially to the bottom of the ear; a hem formed at the bottom edge of the hood completely around the hood; and a resilient wire in said hem for adapting the lower periphery of the hood to comfortably fit various sized heads.

27. In combination, a hair drying hood having an upper portion provided with an air inlet opening and having a larger lower portion formed to receive a person's hair and the upper part of the head; a hem formed around said inlet opening and around the bottom edge of the hood, a detachable clamping ring in the upper hem for detachably securing the hood on a pending pipe section having a lateral flange over which the ring and hem are engaged; and a resilient wire in said lower hem for adapting the lower periphery of the hood to fit various sized heads; said lower periphery being provided with apertures adjacent to said hem for permitting air passing in at said upper opening and through the hair to pass out below the hair; the intramarginal portion of the hood being imperforate to prevent exit of the air at such portion and to cause all of the passing air to pass from the upper to the lower part of the hood.

28. In combination, a blower having a horizontal outlet conduit; an elbow on the end of the conduit having an upturned discharge end; an upwardly pointing conduit leg in said discharge end; a horizontal longitudinally adjustable connecting conduit portion joining the upper end of said leg; a downturned leg joining the free end of said connecting portion; and adapted to receive a hood on its lower portion; and preventing means for positively preventing relative turning movement between said elbow and outlet conduit, whereby said upwardly pointing leg is held upright; one end of said upright leg being free of such preventing means to permit horizontal angular adjustment of the connecting portion.

29. In combination, a blower having a horizontal outlet conduit; an upwardly pointing conduit leg connected to said outlet conduit; a horizontal longitudinally adjustable connecting conduit portion joining the upper part of said leg and adapted to receive a hood at its free end portion; and preventing means for positively preventing relative angular movement between said upwardly pointing leg and outlet conduit, whereby said upwardly pointing leg is held upright; said connecting portion being free of such preventing means to permit horizontal angular adjustment of the connecting portion.

LOUIS RUFFIO.